United States Patent [19]

Helferich et al.

[11] 4,357,165
[45] Nov. 2, 1982

[54] ALUMINOSILICATE HYDROGEL BONDED GRANULAR COMPOSITIONS AND METHOD OF PREPARING SAME

[75] Inventors: Richard L. Helferich, Clayton; William B. Shook, Columbus, both of Ohio

[73] Assignee: The Duriron Company, Dayton, Ohio

[21] Appl. No.: 217,203

[22] Filed: Dec. 16, 1980

Related U.S. Application Data

[63] Continuation of Ser. No. 958,802, Nov. 8, 1978, abandoned.

[51] Int. Cl.³ .............................................. B28B 7/34
[52] U.S. Cl. ...................... 106/38.3; 106/38.9; 106/84; 501/106; 501/122; 501/127; 501/130; 501/133
[58] Field of Search ............. 106/38.3, 38.9, 84; 501/106, 122, 127, 130, 133

[56] References Cited

U.S. PATENT DOCUMENTS

| | | | |
|---|---|---|---|
| 2,131,338 | 9/1938 | Vail | 166/292 |
| 2,277,704 | 3/1942 | Kinzie et al. | 106/57 |
| 2,378,927 | 6/1945 | Jewett | 106/74 |
| 2,493,693 | 1/1950 | Parkinson | 106/74 |
| 2,502,418 | 4/1950 | Callis | 106/118 |
| 2,842,444 | 7/1958 | Emblem et al. | 106/38.3 |
| 2,911,311 | 11/1959 | Feagin et al. | 106/38.9 |
| 3,017,677 | 1/1962 | Greenwald | 106/38.3 |
| 3,203,057 | 8/1965 | Hunt et al. | 106/38.3 |
| 3,218,683 | 11/1965 | Nishiyama et al. | 106/38.3 |
| 3,306,758 | 2/1967 | Miller | 106/74 |
| 3,423,216 | 1/1969 | Somers | 106/38.3 |
| 3,600,203 | 8/1971 | Aldera | 106/38.3 |
| 3,804,641 | 4/1974 | Lyass et al. | 106/38.35 |
| 3,804,643 | 4/1974 | Arita et al. | 106/38.9 |
| 3,874,885 | 4/1975 | Lyass et al. | 106/38.9 |
| 3,881,947 | 5/1975 | Palmer | 106/38.35 |
| 3,892,579 | 7/1975 | Mabie | 106/38.3 |
| 3,923,525 | 12/1975 | Toeniskoetter et al. | 106/38.3 |
| 3,930,872 | 1/1976 | Toeniskoetter et al. | 106/38.3 |
| 4,056,937 | 11/1977 | Suzuki | 106/74 |
| 4,070,195 | 1/1978 | Toeniskoetter et al. | 106/38.3 |

OTHER PUBLICATIONS

Davis et al., *Jour. of AFS*, "Steel Molding Sands Bonded with Sod. Silicate and Sod. Aluminate," pp. 11-14, Apr. 1964.

*Primary Examiner*—Lorenzo B. Hayes
*Attorney, Agent, or Firm*—St. Onge, Steward, Johnston & Reens

[57] ABSTRACT

Granular compositions are disclosed for use in preparing hard, water and erosion-resistant, shapes such as foundry molds and cores, that are self-setting under ambient atmospheric conditions to allow such shapes to be stripped from patterns on which they are formed, such pattern stripping being possible immediately after forming in the case of foundry cores and the like, and within controllable pattern strip times as low as 60 seconds for foundry molds. The shapes may be used without baking and, in the case of foundry molds and cores, are ready for casting molten metal within as little as one hour. Molds and/or cores free of organic materials can be formed with the novel compositions, providing essentially carbon-free surfaces at the mold-metal interface, as well as being free of other deleterious elements such as sulfur, phosphorus and boron, thereby avoiding alloy composition alteration at the interface due to migration during casting. The refractory compositions of the invention incorporate unique aluminosilicate hydrogels of alkali metals as binders, are compatible in use with existing industrial foundry mold/core-forming equipment and procedures, and are eminently free of environmental (toxicity) problems in the foundry atmosphere.

27 Claims, 5 Drawing Figures

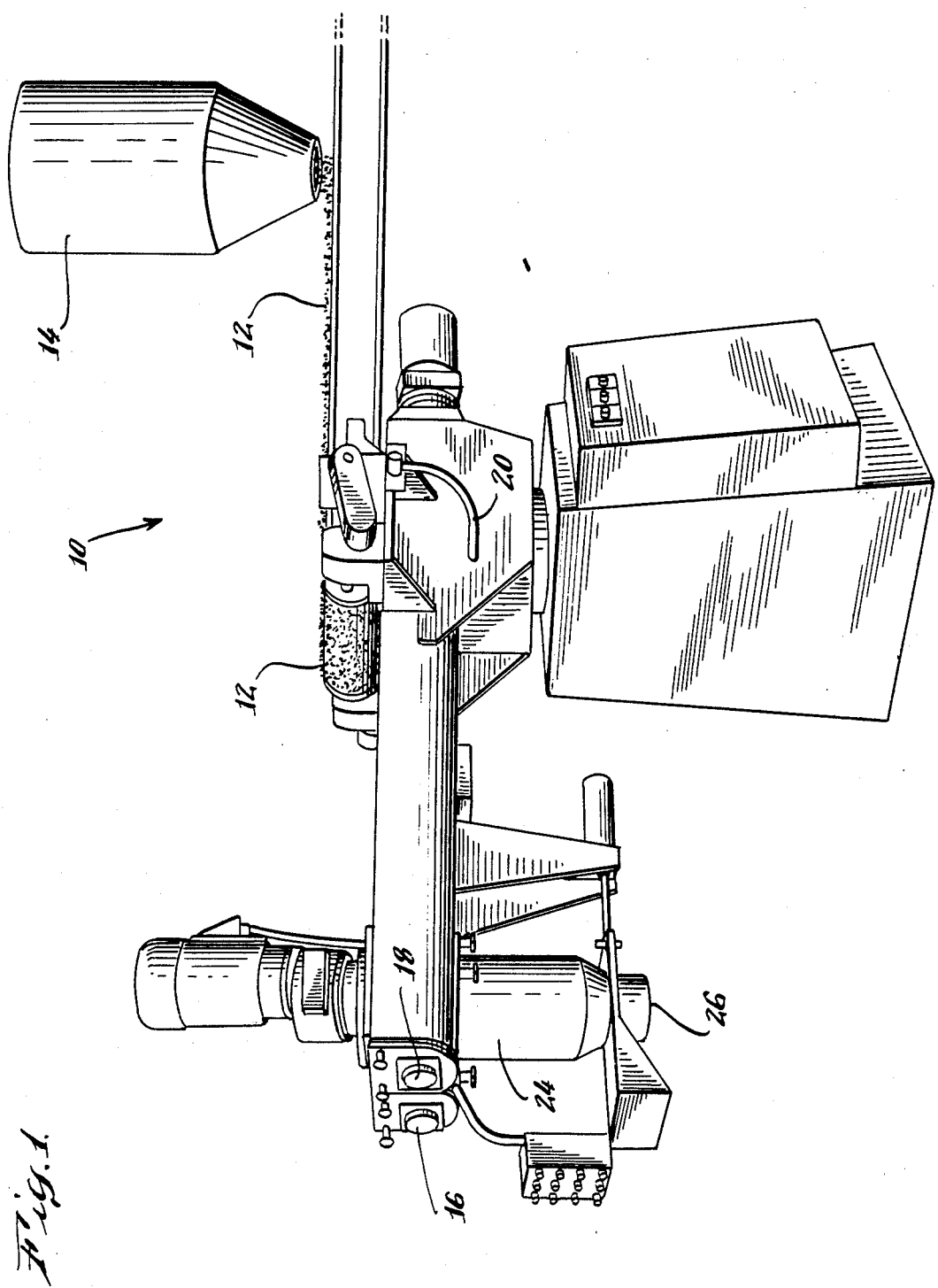

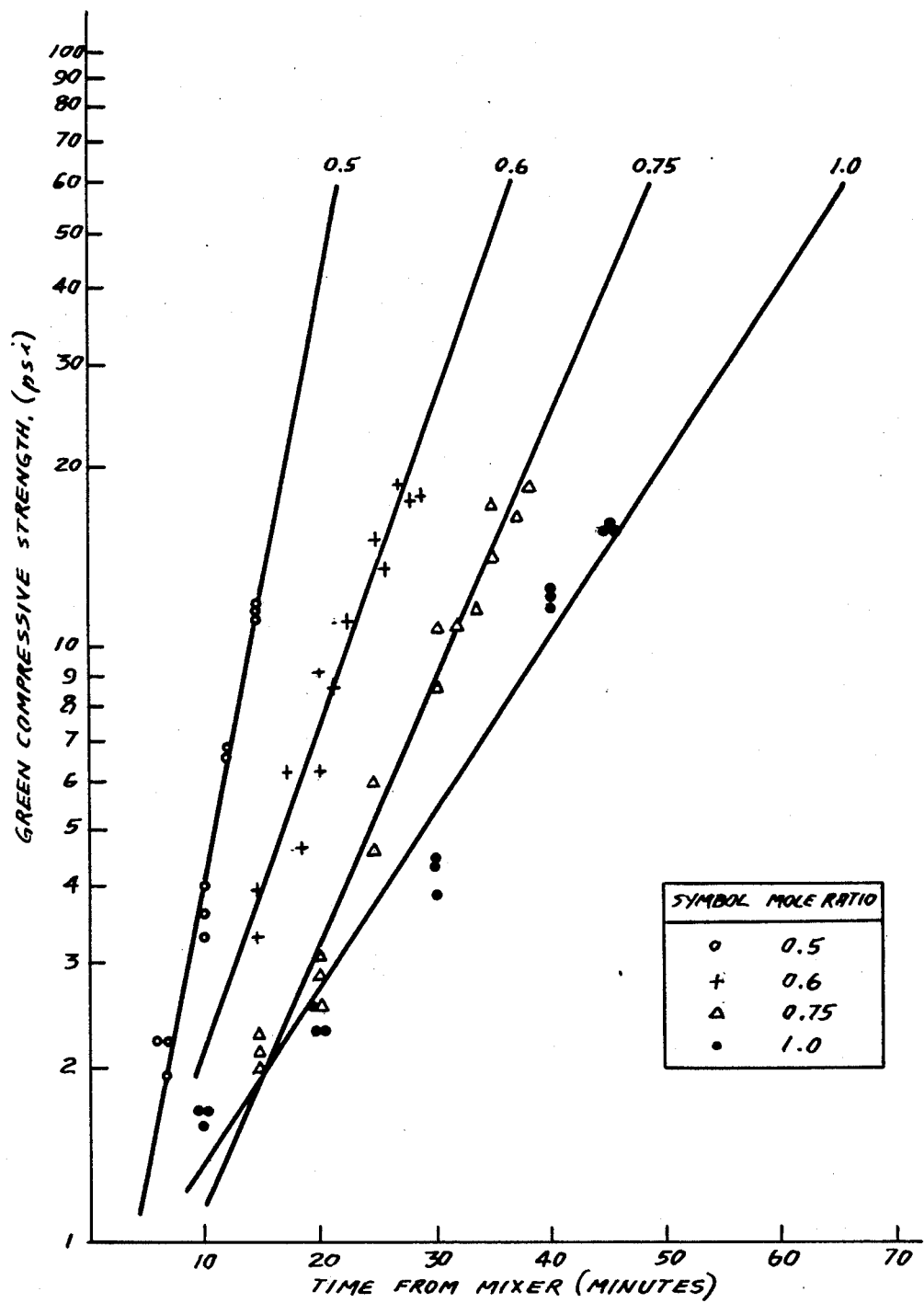

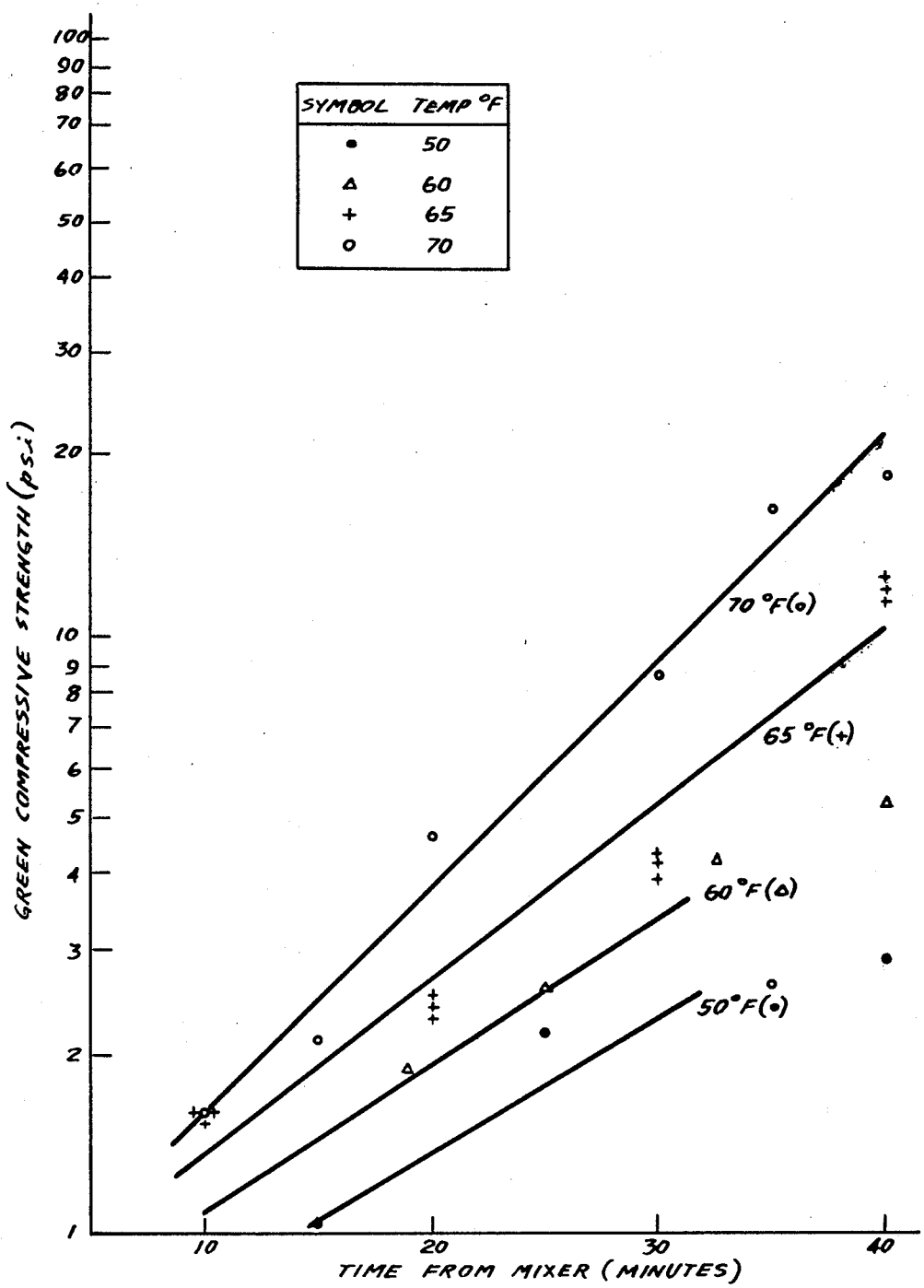

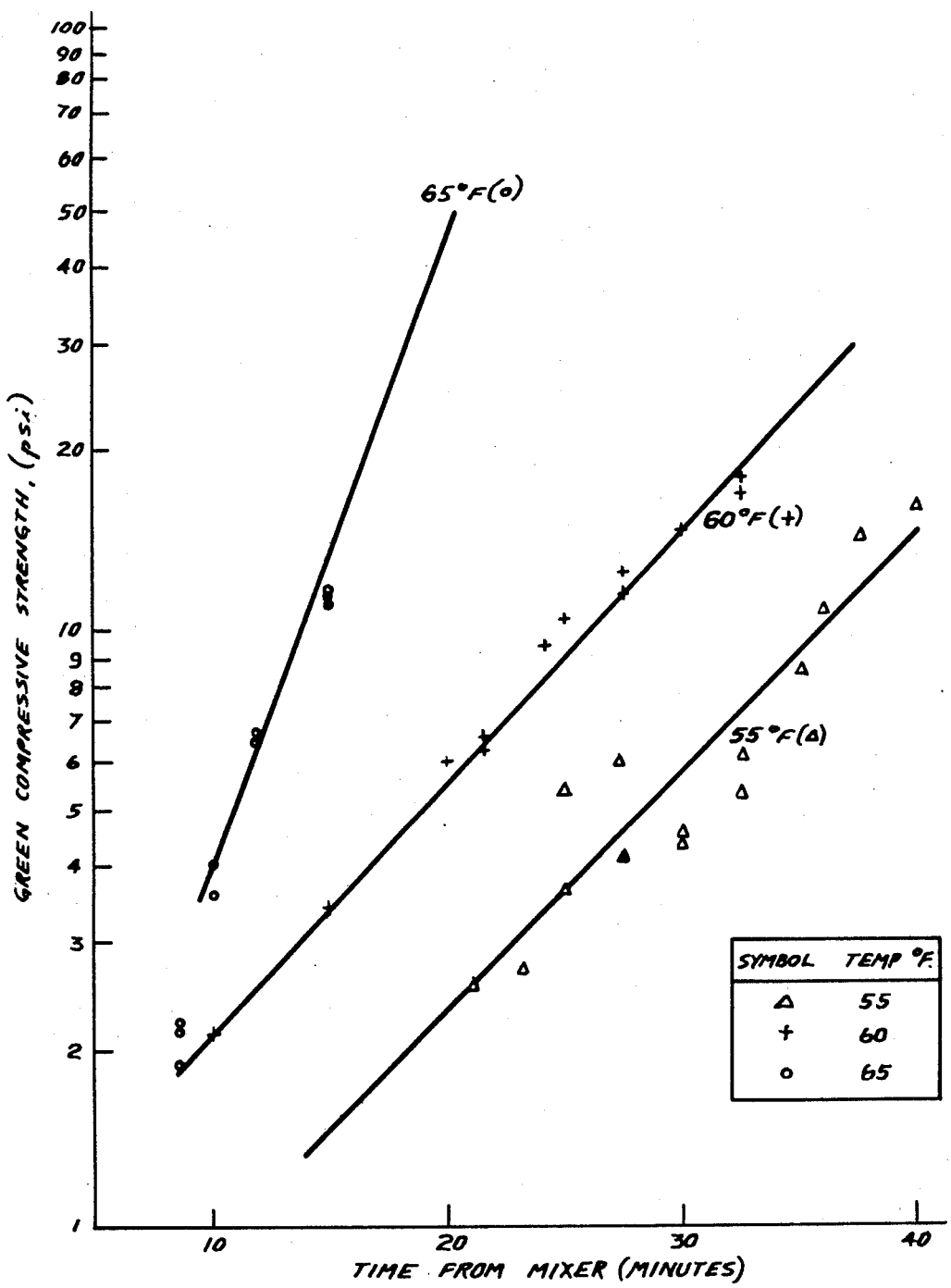

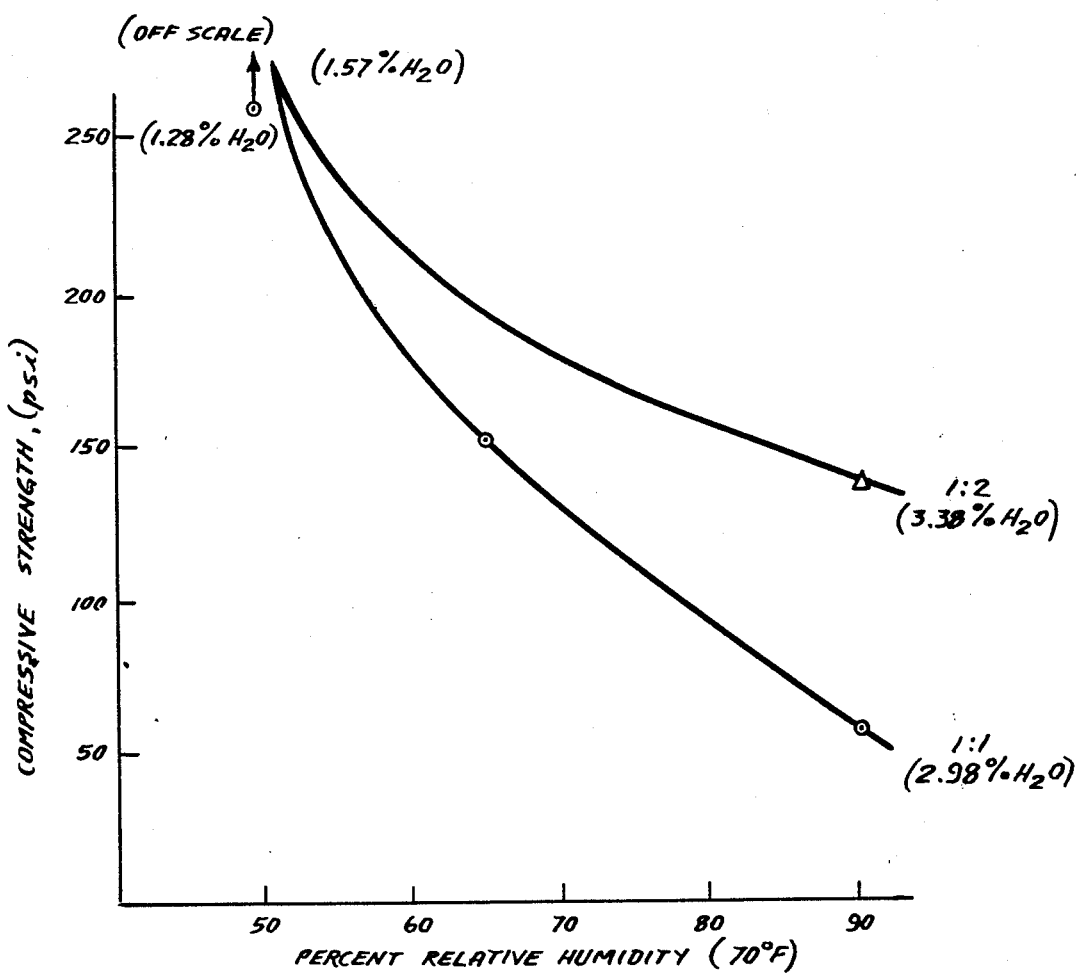

ALUMINOSILICATE HYDROGEL BONDED GRANULAR COMPOSITIONS AND METHOD OF PREPARING SAME

This is a continuation of application Ser. No. 958,802, filed Nov. 8, 1978, now abandoned.

BACKGROUND OF THE INVENTION

1. Field of the Invention

This invention relates to moldable granular compositions that are self-setting under ambient conditions. The invention finds general application in the production of shaped articles such as grinding wheels, electrical or thermal insulators, bricks and similar structures of bonded granular composition, but is particularly concerned with foundry sand compositions, and their method of preparation, which are self-setting in a controllably short time under ambient atmospheric conditions, and do not require baking or firing to develop adequate strength and rigidity to receive molten metal, yet are effective to provide flaw-free surfaces on finished castings.

The novel compositions are notably free of deleterious elements that could cause pollution of the atmosphere due to evolution of toxic or hazardous gases during cure or when the shapes are subjected to high temperatures as in casting of molten metal into foundry molds made of the compositions. The compositions are also free of contaminating elements which, if present in foundry mold or core surfaces, have a tendency to migrate into the adjacent molten metal at the interface with the mold during the casting process, thereby adversely affecting critical alloy compositional requirements of the final castings.

The principal current interest in the invention is its application to the foundry art for providing self-setting molds and cores having substantial advantages over prior systems in terms of meeting environmental, material and energy cost, and high rate of production, considerations. Accordingly the invention is discussed principally herein with relation to its foundry use, but as will be apparent it has many other applications.

2. Description of the Prior Art

Trends in the foundry industry in recent years have been toward processes which minimize labor requirements, both from the standpoint of quantity and skill level, are low energy consumers, and are capable of high production rates. To meet these requirements, a number of no-bake or air-setting binder systems have been developed that, when combined with some of the newer continuous mixers available on the market, are capable of producing molds and/or cores which can be stripped from the pattern as a rigid, self-sustaining sand mass in as little as 1½ to 2 minutes. Molds and cores made from these systems are relatively erosion resistant to molten metal and produce castings of superior dimensional reproducibility over those employing conventional green sand molding practices.

Particulates such as silica sand, clay and the like are bonded together to form the desired molds or other shapes. A wide variety of chemical binder systems are commercially available and are being used routinely in steel foundries. These systems are considered self-setting in nature in that they require no external heat source to effect the bond. The following tabulation outlines those available binder systems, categorizing them chemically as either inorganic or organic in origin:

| Summary of Available Self-Setting Binder Systems | | |
|---|---|---|
| I. | Inorganic | |
| | A. | Cement |
| | | 1. Portland |
| | | 2. Modified Portland |
| | | 3. Calcium Aluminate |
| | B. | Sodium Silicate |
| | | 1. Cement |
| | | 2. Sodium Silicofluoride |
| | | 3. Silicon Metal or Ferrosilicon |
| | | 4. Organic Ester |
| | C. | Polyphosphate |
| II. | Organic | |
| | A. | Furan |
| | | 1. High Nitrogen |
| | | 2. Medium Nitrogen |
| | | 3. Phenol-Formaldehyde |
| | B. | Alkyd Isocyanate |
| | C. | Phenolic |
| | D. | Phenolic Urethane |

In the case of inorganic foundry mold mix systems, which are of more particular interest here, the available systems have evolved over the years into what may be generally classified as three basic types, these being identified in terms of the binding agents employed as hydraulic cement bonded type, sodium silicate bonded type and, more recently, polyphosphate bonded type.

Cement bonded sands are more common in Europe than in the United States, and are used almost exclusively for large scale molding operations. Approximately 8 to 10 percent Portland cement is used, with a water-to-cement ratio of 0.4 which means that considerable setting time is required. In fact, strip times of 12–16 hours are normal, with approximately 24 hours being required between molding and pour-off. Recent developments have improved the setting characteristics by incorporating either cement accelerators or modified Portland cement compositions, which has provided strip times approaching 15–30 minutes, while the required time between molding and casting has been reduced to less than 4 hours. However, two major disadvantages are inherent in these systems which inhibit their use in the casting of high quality steels and high alloys. The cement accelerator systems rely on an organic catalyst derived from raw molasses which gives rise to carbon pick-up in the cast metal, while the modified Portland cement systems contain large amounts (e.g. 17%) of calcium sulfate which gives rise to potential carbon and/or sulfur contamination in the castings.

Calcium aluminate cements have been used for some time in castable refractories for ladle and furnace linings; their application to sand molding, however, is relatively new. See U.S. Pat. No. 3,600,203. Typical binder levels and strip times are similar to the modified cement compositions mentioned above but they are still limited by the high water of hydration contents. No information with respect to casting performance has been found in the literature.

Sodium silicate bonded sand mixes represent the largest share of the so-called inorganic mold sand compositions currently being utilized in steel and high alloy foundries. At least five systems based on sodium silicate binders have been proposed or are in commercial use, as shown by the technical literature and the patent art. The major difference between each system lies in the particular type of catalyst used in establishing the silicate bond. The systems are commonly known by the following names: (1) silicate/carbon dioxide process; (2) silicate/cement or fluid sand process; (3) silicon metal or ferrosilicon process, also sometimes referred to as the Nishiyama process; (4) silicate/sodium silicofluoride (hexafluorosilicate) process; and (5) silicate/ester process.

The sodium silicate/carbon dioxide process is the most widely used inorganic system available to the foundry industry, and considerable literature concerning its foundry use is available. See "The $CO_2$–Silicate Process in Foundries", *British Cast Iron Research Association*, Westerham Press, Ltd. (1972). For many foundry operations, however, this system has disadvantages due to the carbon content accumulated in the mold after carbon dioxide gassing. In addition, the as-gassed molds exhibit poor humidity resistance and are susceptible to moisture absorption before pour-off under typically humid summer conditions. In addition, due to the gassing times required (60–90 seconds) the rate of mold production, with given molding equipment, is definitely limited.

The silicate/cement or fluid sand process utilizes the dicalcium silicate content of Portland cement or blast furnace slag to essentially dehydrate the sodium silicate, causing the sand mass to obtain gradual set. See "Sodium Silicate and Portland Cement as a Binder for Molding Sand", E. Leal, *Steel Foundry Facts*, February 1969, page 2; also "Innovations in Molding and Casting Process", P. F. Wieser, *Steel Foundry Facts*, February 1974, page 21. This system is similar to the conventional cement process in that long strip times are required and pour-off is not recommended before 12 to 16 hours. Since the initial water content is simply transferred to the cement and not removed this system also displays limitations similar to those of the conventional cement process with respect to water-related pour-off complications in steel castings.

The Nishiyama process utilizes silicon metal, ferrosilicon or calcium silicon fines to react with the water portion of the soluble sodium silicate, thereby essentially dehydrating the silicate and providing a cohesive bonding at low water contents. See "Silicon Metal Fines Used for Setting Sodium Silicate Bonded Steel Foundry Molds", Bates, Samco and Wallace, Steel Founders' Society of America, Report No. 61, January 1966; also Nishiyama U.S. Pat. No. 3,218,683. Several major disadvantages are found in commercial use of the process, one of the more important being the fact that a major by-product of the silicon metal reaction with water is the evolution of considerable quantities of hydrogen gas. This poses a potential fire and explosion hazard under foundry operating conditions. Also the silicon metal or ferrosilicon catalyst is prone to variations in its catalytic abilities, depending upon the initial water content, sizing, age and temperature of the sand mix. Another disadvantage is the high cost and poor availability of the finely powdered catalyst material required.

The sodium silicate/sodium silicofluoride process, like that just described, has a disadvantage due to evolution of fluorine gas at metal casting temperatures. The cost and availability of the sodium silicofluoride are again problems. Although the system is disclosed in an article entitled "Recent Developments in Self-Setting Sands", R. F. MacDonald, *Steel Foundry Facts*, February 1973, page 42, there is no literature reporting any production use of this particular system.

More recent developments in self-setting, sodium silicate sands rely upon weak acids or liquid organic materials as the gelling agent. See "Sodium Silicate as a Molding Media", A. F. Waller, *Steel Foundry Facts*, February 1973, page 48; "No Bake Molding and Core Process", T. A. Englate, *Steel Foundry Facts*, February 1975, page 14; and Palmer U.S. Pat. No. 3,881,947. These liquid organic materials consist mainly of polyalcohol esters, which, being acidic, neutralize the sodium hydroxide phase of the silicate, causing gellation. See "Inorganic Self-Setting Binder Systems", J. M. Svoboda, *Casting Metals Institute Short Course No. 201*, 1975. Strip times are solely dependent on the type and not the amount of catalyst, with 10–15 minutes being a practical minimum strip time. While these systems are capable of developing the proper molding characteristics, they have the same two major disadvantages as that of the sodium silicate/carbon dioxide process. Carbon levels of the recommended sand/binder formulations are between 0.3 and 0.4 percent and consequently there is potential for migration of carbon from the mold at the interface with the metal during the casting process. Corrosion resistance and other properties of the casting can thus be adversely affected. In addition, the binder system under discussion is water soluble and generally results in as-set molds which exhibit poor humidity resistance, being prone to take-up of excess atmospheric moisture during the cure time following stripping from the pattern.

A more recent inorganic binder system based on a polyphosphate bond has become available. See "Performance Aspects of a New, Non-Silicate Inorganic No-Bake Binder for Foundry Mold and Core Applications", *AFS Transactions*, Vol. 74, page 463. Preliminary casting evaluations using such a binder system have indicated a phosphorus pick-up, and a potential to mold cracking leading to veining in the resulting castings. Of the several inorganic systems mentioned, this one is also the most expensive.

The practical foundry art has never employed, and with the possible exception noted below, has never suggested a binder system such as that forming the basis for the present invention, in which the reaction between a soluble silica source and a soluble alumina source in an alkaline medium is utilized to develop a suitable gel. The chemical reaction involving these two materials has, of course, long been known, more particularly as the basis for cation exchange systems in water softeners, and for forming molecular seives. In a publication entitled "Soluble Silicates, Their Properties and Uses" by James G. Vail, *Chemistry*, Vol. 1, page 236, Reinhold Publishing, 1952, there is a general discussion of "artificial zeolites" based on a gel obtained by mixing solutions of sodium silicate and sodium aluminate, but the publication contains no suggestion of any application to bonding particulate matter in preparing formed shapes. Vail was issued U.S. Pat. No. 2,131,338 directed to employing very dilute silicate/aluminate solutions as impregnating agents in preformed porous natural earth strata to cause gellation in situ. The purpose was to effect consolidation of the strata which would otherwise be unsuitable for supporting building foundations. The patent mentions in this connection that the gel has considerable water resistance and accordingly might be useful in impregnating "porous castings, cement blocks and sand molds"; but the patent gives no details in respect of any such suggested uses.

A report entitled "Steel Molding Sands Bonded with Sodium Silicate and Sodium Aluminate", Davis and Lownie, *Journal of AFS*, April, 1964, has been published on work done at the Battelle Memorial Institute Laboratories investigating the use of sodium silicate and sodium aluminate, also colloidal silica and sodium aluminate, both in foundry sand binder applications. The amount of aluminate used was quite low (0.027%), primary emphasis being laid on the silicate. No mention appears relative to any self-setting or no-bake mold/core making process. Casting trials showed scabbing and rattail defects with these mixes, and the conclusion reported was that the mixes were unsuitable for foundry use and no further work was recommended.

In a more recent publication entitled "Studies on Alkali Alumino-silicate Hydrogel", Mitra and Roy, *Transactions of the Indian Ceramic Society*, Volume XXXI (1972), pages 33–35, 52–56, 82–85 and 87–92, investigations are reported involving sodium silicate and sodium aluminate for the purpose of producing artificial zeolites. Gellation kinetics were studied and maximum gellation rates were determined in terms of mole ratios of alumina and silica in the aluminate and silicate solutions. While this work is quite definitive on the kinetics of the silicate/aluminate gel formation, and the study included silica/alumina mole ratio and concentration ranges that are now found useful for binder purposes in forming shapes of granular or particulate matter, the only work reported by the authors concerns that of forming gels for water treatment systems which involve totally different considerations. That is, the concept of coating granular particles and the associated problems inherent in self-setting, no-bake bonding requirements is foreign to anything considered by the authors, and the article accordingly gives no clues or suggestions as to possible application of the technology to the field of interest here discussed.

In addition to the foregoing technical literature, there is additional U.S. patent art directed specifically to binder systems for various mold and core mixes for foundry sands. Representative of the patent art thought to be most pertinent, in addition to the patents already mentioned, are the following.

U.S. Pat. Nos. 2,502,418; 3,600,203 and 3,874,885 deal generally with hydraulic cement type binders for mold or core mixes. The first of these employs a hydrated alkaline earth metal oxide and a water soluble alkali metal aluminate in a highly fluid slurry of granular material in order to allow it to be molded (in a filter press) to produce heat insulating blocks. The second patent utilizes a calcium aluminate cement plus a lithium chloride accelerating agent to improve the self-setting rate. In both cases, substantial amounts of water must be removed and the set times are long, usually at least an hour or more. The third patent in this group teaches incorporation of lithium carbonate as a catalyst, a source of carbon contamination in the finished casting if used in foundry mold/core making.

Several patents disclose refractory mixes utilizing alkali or alkaline earth metal aluminates without the addition of hydraulic cements. See for example U.S. Pat. Nos. 2,911,311; 3,017,677; 3,423,216 and 3,804,641. These however all employ various other adjuncts such as chlorides, silicone oil, ethyl silicate, ligno sulfonate, etc., and only the last of these appears to have any self-setting capability but is objectionable because of sulfur content. None incorporates any silicate.

U.S. Pat. No. 3,203,057 teaches combinations of silicates with aluminum oxide, but the insolubility of the oxide presents problems. The use of boronated aluminum phosphate binder systems (no silicates being present) is discussed in U.S. Pat. Nos. 3,923,525, 3,930,872 and 4,070,195. Phosphates as well as boron compounds however are potentially troublesome for steel and high alloy foundry applications on account of contamination of castings by migration at the mold surface. Cost, long strip times, non self-setting properties are additional problems with these systems.

SUMMARY OF THE INVENTION

In an attempt to eliminate some of the problems and disadvantages of the previously available binder/particulate mixes, and more especially for foundry sand mold and core production, it has been discovered that this can be accomplished to a degree not heretofore possible through use of a carefully controlled granular base and a particular form of alkaline aluminate/silicate binder solution in proper proportions. The resulting composition is self-setting under ambient atmospheric conditions and, depending on size and complexity of shape configuration, it may be stripped from a pattern almost immediately after the shape is formed. This however is controllable to provide longer strip times, as may be desired for different applications. In the case of foundry molds and cores, these are ready for casting without any preliminary baking or firing, normally within the usual time interval involved in practical foundry operation between stripping and getting ready for the metal casting operation.

Principal objectives of the invention include the provision of a self-setting, no-bake particulate binder system, non-toxic or non-contaminating of the atmosphere. Although not restricted to foundry use, that represents currently one of the more important applications because the invention fills a specific need of considerable commercial interest in that field. And although also not restricted to inorganic molding and core making compositions, that again is an area of special interest because of unique properties of the invention compositions for that use. In its application to foundry use the invention provides a molding and casting process that is compatible with current manual or semiautomatic mold/core production in a conventional green sand foundry. Emphasis is placed on increased productivity and minimum skilled labor requirements, relative to conventional green sand practice, as well as improved dimensional reproducibility of pattern configuration. It is a further object to lower the potential for pick-up of carbon and other contaminants at the mold surface/cast metal interface. The raw materials required are non-proprietary and readily available, and the handling or mechanical operations involved in preparing the mix are comparable to those of green sand systems already generally in use and of comparable cost. Also, reclaimed sand from molds made in accordance with the invention is compatible with existing green sand systems whose operation may accordingly be retained in the same foundry without complications.

Additional objectives, relative to green sand practice, include obtaining a better casting surface quality, especially on deep-draw, essentially vertical surfaces; reduction in casting repair requirements for mold-related dirt/slag defects; and improved casting dimensional reproducibility. Good shakeout of molding sand from finished castings is also an object, using conventional sand blasting techniques to reduce or eliminate need for special mechanical equipment for the purpose.

The system here disclosed meets these objectives and while sharing certain advantages of other no-bake binder systems, it has few of the disadvantages of those prior systems in respect to high binder cost and proprietary limitations, OSHA and EPA problems and others as will become apparent from the following detailed description. The foundry industry in particular is accordingly afforded a significant advance in molding capability.

BRIEF DESCRIPTION OF THE DRAWINGS

FIG. 1 is a perspective view of typical mixing equipment for preparing molding sand compositions of the invention;

FIG. 2 is a semilogarithmic graph showing green compressive strength development with time for prepared sand mixes having different alumina/silica mole ratios in the binder;

FIGS. 3 and 4 are semilogarithmic graphs of rate of green strength development at different ambient temperatures for a sand mix employing 1.0 and 0.5 mole ratios of alumina/silica binder;

FIG. 5 is a graph representing the effect of relative humidity at 70° F. on the resultant compressive strength of sand mixes employing alumina/silica mole ratios of 0.5 and 1.0 in the binder.

DETAILED DESCRIPTION OF THE PREFERRED EMBODIMENTS

As noted above, this invention finds particular application in metal foundries engaged in production of metal castings, especially castings of some intricacy of form or shape such as pump and valve housings, and notably castings of highly corrosion and abrasion resistant alloy steels. The composition of such alloys is quite critical to their achieving expected or complete life use where exposure to highly corrosive chemical environments is involved; for example, in fluid conduit systems carrying nitric, nitric/adipic, sulfuric and similar oxidizing acid solutions. The founding of alloys designed for use in such severe service requires observance of extremely close alloy composition tolerances in respect to certain elements, notably carbon, phosphorus and sulfur. Although care is taken initially to exclude or reduce such contaminants in a furnace melt preparatory to casting, the casting operations inherently re-expose the melt to contamination from the environment; e.g. dust or dirt in the foundry. Also there is the serious problem of pick-up, already mentioned above, arising from migration of low-level potential contaminants in the mold to the molten metal by interface contact upon being cast in the mold. Consequently the composition of the mold in that context is most significant, quite apart from other compositional requirements needed to satisfy the physical or mechanical properties of a foundry mold. The extent of the problem can be better appreciated in respect to special alloys, for example CD4MCu, in which maximum carbon, sulfur and phosphorus levels under ASTM standard may typically not exceed 0.04% in each case. If the mold surfaces contain carbon, for example at a level of 0.1%, the metal composition adjacent to the mold surface can easily become "out of specification" in terms of carbon content by pick-up through migration from the mold surface. The corrosion resistance of that surface in the finished casting will accordingly be lowered. Solving problems arising from minimizing the effect of sand mix compositions on metal castings produced in molds of such compositions often comes into direct conflict with sand mix compositional requirements dictated by the need to meet physical or functional properties of the molds as molten metal receivers. Such requirements include consideration of factors affecting rate of strength development in a mold, ultimate strength and overall sand properties, including porosity, shake-out capability, resistance to ambient relative humidity effect on molds stored prior to pour-off and of course cost, to name a few. The variety of variables encountered in formulating a satisfactory foundry sand mix are so numerous, as well as being both dependent upon and independent of each other, as to render it impractical to effectively predict from prior work with other mixes what will or will not afford a satisfactory composition. In the face of this, the invention here provides a unique and unobvious foundry sand mix composition which satisfies many foundry requirements in a different manner than has been proposed heretofore, and offers advantages over such prior systems in a number of important respects.

The foundry sand mixes utilizing this invention are composed primarily of a refractory granular base of silica or metal oxide type; e.g. silica, zircon, olivine, alumino-silicate or chromite sands as the predominating component and commonly including in addition a minor amount of kaolin clay. Optionally the granular base may also contain a minor amount of mullite. This granular base is bonded together for preparation of foundry molds by mixing with it, as the molds are prepared, aqueous solutions of alkali metal silicate (e.g., Diamond Shamrock Grade 50 sodium silicate) and alkali metal aluminate (e.g., Nalco #5 sodium aluminate). These solutions react to produce the alkali metal hydroxide hydrous aluminosilicate gel which forms the binder. The resulting molding composition is introduced into molding flasks or core boxes containing the desired pattern, and the mix compacted to get conformance with the pattern surface. It is allowed to set, in this case for periods as short as 60–90 seconds under ambient atmospheric conditions in the foundry, and then the pattern and flask or core box are removed from the mold. If the finished casting requires use of cope and drag portions and a core, the complementary part of the mold and the core are prepared from sand mix on appropriate patterns in the same manner described above, and the mold parts are then assembled to form the complete casting mold using a refractory glue or cement, or simply wiring the mold parts together, in conventional manner.

For simplicity the term "mold" is sometimes used herein in a generic sense to refer to any receptacle for molten metal, including cope, drag and core components collectively, as well also to refer specifically to a cope, drag or core-forming member individually. It will be apparent from the context which meaning is intended in any particular instance. Also, for simplicity of reference the term "aluminosilicate" is commonly used herein to designate the binder, in place of the more complete terminology "alkali metal hydroxide hydrous aluminosilicate gel".

Silica sand, because of ready availability and lower cost, is the material of choice, although zircon sand is eminently satisfactory if availability or cost is not a problem. Mixtures of the two are also practical. In general, a sand having a fineness of 68–70 under the AFSGFN rating system gives best results for molding purposes, with a somewhat finer (e.g., 85–90) AFSGFN being preferred for core making. Adequate compressive strength of molds usually requires inclusion of a small amount of an alumina bearing material (e.g. kaolin clay) and is therefore usually incorporated. Shakeout of the mold after casting is improved by the further inclusion of mullite, which however is optional as further illustrated herein. These three constitute the granular base of the mix, to which the binder is then added.

It is found that the range of mole ratios of aluminum oxide ($Al_2O_3$) to silicon dioxide ($SiO_2$) in the gel resulting from admixture of solutions of sodium aluminate ($xNa_2O.yAl_2O_3.nH_2O$) and sodium silicate ($xNa_2O.ySiO_2.nH_2O$) is critical to achieving suitable binder properties in the foundry mix. While mole ratios outside the range of 0.33 to 2.0 ($Al_2O_3:SiO_2$) will produce a gel having some binding effect, those ratios represent the preferred foundry limits. The optimum within that range will vary from about 0.45 to 1.0, depending on considerations such as amount of binder used, type of silicate (e.g. sodium or potassium), temperature and humidity conditions to which the raw sand as well as resulting mix is exposed, and desired set time for the mold mix.

FIG. 1 illustrates a typical multistage mixing apparatus suited to the process here involved. Dry sand 12 enters from an overhead hopper 14 into two separate horizontal mixing troughs 16, 18 having motor driven augers which agitate and thoroughly comingle the granules while advancing them from the respective input ends. Dry additions such as iron oxide, kaolin clay or the like may be added into each horizontal trough at this time via a suitable volumetric feeder. These dry ingredients mix and advance through the trough. Separate solutions, one of alkali metal silicate, the other of alkali metal aluminate, are metered through pipe lines 20, 22 (not shown) to their respective input points on the horizontal mixing troughs. The solutions become intimately mixed with the respective portions of granular material and are uniformly distributed throughout the sand by the time the separate portions reach the discharge points. These two streams of solution-coated granular materials are equally discharged and combined into a third mixing unit 24 capable of high through-put and intense blending action. The high intensity blending unit also has a motor driven mixing blade which thoroughly recombines the two portions of the now coated mix. The finished mix is discharged at 26 from the mixer directly into molding flasks or core boxes for compaction. This type of intense, rapid mixing and discharge is necessary to take advantage of the very fast setting aluminosilicate bonding action. Other types of mixing equipment capable of intensely and rapidly mixing the two liquid binder materials with the particulate matter are also suitable.

The mold making procedure employed with the invention mixes can involve all types of molding procedures commonly used with green sand, including the conventional jolt-squeeze method; that is, chill placement, facing sand added, jolt to distribute evenly and accurately reproduce the pattern, add backup sand, final jolt-squeeze, rollover and draw. The finished sand mold is removed from the pattern as soon as set, which in the case of sand mixes of this invention can be made to occur within as little as 60–90 seconds under normal ambient temperature and humidity conditions. No heating or baking of the mold is required. In fact such treatment may significantly reduce subsequent moisture resistance, storage strength, and resistance to scabbing, if introduced before the mold has had a chance to cure, as discussed more hereinafter. Even normal skin drying under very low humidity conditions (winter operation) in the foundry may produce some adverse effects. Accordingly the finished mold, composed of cope, drag, and core, should be assembled promptly after demolding so that the mold cavity is kept closed as much as possible.

As illustrative of the best mode presently known for practicing the invention, details of foundry mold mixes and their preparation in accordance with this invention are set forth in the following examples, and parameters of possible variations from these optimum conditions are discussed.

EXAMPLE 1

Using a base silica sand at a constant 85°–90° F. sand temperature, the following mix composition will have a mold strip time of approximately two minutes:

| | | |
|---|---|---|
| 100 | p.b.w. | dry silica sand (AFSGFN 68-70) |
| 2 | p.b.w. | calcined Kaolin clay |
| 2.4 | p.b.w. | sodium silicate (Diamond Shamrock #50) |
| 2.3 | p.b.w. | sodium aluminate (Nalco #5) |
| 0–3 | p.b.w. | Mullite 100 fines | p.b.w. = parts by weight

These materials are mixed in the apparatus described above. The mullite addition is listed as variable and may be omitted. If used, the shakeout properties (i.e., removal of the mold from a casting after cooling) will improve with increase in mullite content but with a concommitant lowering of compressive strength.

The standard grade sodium silicate material specified (Diamond Shamrock #50) has a 2:1 ratio of silica ($SiO_2$) to soda ($Na_2O$), with a total solids content of 44% by weight, balance water, and a specific gravity of 1.53. The sodium aluminate standard grade material specified (Nalco #5) has a 1:1 alumina ($Al_2O_3$) to soda ratio, 45% total solids, balance water, specific gravity 1.56. The amounts of these solutions above specified produce a gel having an alumina/silica mole ratio of 1:2 (or 0.5).

Typical sand mold properties, at four and twenty four hours after preparation in a 50% relative humidity curing environment, are given in Table I below.

TABLE I

| SAND MOLD PROPERTY | 4 hours | 24 Hours |
|---|---|---|
| Permeability | 140cc | 140cc |
| Tensile Strength | 80–100psi | 100–130psi |
| Mold Hardness | 95 | 98–100 |
| Scratch Hardness | 80 | 90 |
| Hot Compressive Strength (2150° F.) | 30–40psi | 30–40psi |
| Hot Deformation Under Load (2150° F.) | 0.006in/in | 0.006 in/in |
| Free Expansion | 2.0% | 2.0% |
| Loss on Ignition (LOI) | 2.5% | 2.5% |

EXAMPLE 2

A mix is prepared, similar to that of Example 1, being composed of 100 p.b.w. of premixed Portage dry silica sand (AFSGN 68-70) and 2 p.b.w. B&W kaolin clay prepared in a standard 2000 pound muller, stored and fed by a bucket elevator to a Dependable Fordath continuous mixer of the kind illustrated in FIG. 1. Mullite 100 fines, up to 3 p.b.w., may be added in the two primary mixing troughs 16, 18 at a predetermined rate. Sodium silicate (Grade 50) is dispensed into one of the primary troughs, while sodium aluminate (Nalco #5) is dispensed into the other mixing trough. After mixing for approximately 30-45 seconds, both coated sand streams are continuously deposited into the secondary turbo high intensity mixing trough 24 for an additional residence mixing time of 3-9 seconds. This mix is then ready for molding. The alumina/silica mole ratio is 1.0 and molds of this formulation are sufficiently strong after 10 to 12 minutes at ambients of 80°±5° F., 50% humidity, to permit stripping.

Low temperature curing treatment for 1 hour (160°-180° F.) following cure at 70° F., 50% relative humidity for 24 hours may be utilized to reduce loss on ignition without significantly reducing tensile strength. Again it is found that high temperatures during this cure period cause a rapid decrease in tensile strength.

Light vibration in combination where necessary with hand tucking gives satisfactory compaction in production of cores.

The rate of compressive strength development is affected, to a great extent, by the specific alumina/silica mole ratio of the binder, followed in order by mix temperature and then binder concentration. At constant temperature (65° F.) and binder concentration (45% solids), changing the alumina/silica mole ratio from 1.0 to 0.5 decreases the set-up time (i.e., the time required to achieve 12 psi compressive strength in the mold) from 40-45 minutes to approximately 15 minutes. The rate of compressive strength development as a function of the mole ratio in the binder is plotted in FIG. 2.

Reference is sometimes made in the description and claims hereof to a rigid bond being developed within the set time between the particles of the mix. By rigid it is here meant that a mold has achieved a state of set which allows it to be easily stripped from a pattern and handled in a normal manner under practical foundry operation procedures, preliminary to casting, without danger of significant chipping or other damage. Such state of rigidity is found at the above-mentioned 12 psi compressive strength level for molds of the present invention. This compares with a commonly used standard of 6-8 psi compressive strength for conventional green sand molds.

Variations in compressive strength with temperature, at constant alumina/silica mole ratios of 1.0 and 0.5, are similarly illustrated in the graphs of FIGS. 3 and 4, respectively. For a 1.0 mole ratio system and assuming again a 12 psi compressive strength level, the set-up time is approximately 35 minutes at 70° F. This increases to approximately 60-65 minutes when the temperature is 50° F. Similarly, for the 0.5 mole ratio system, the (12 psi) set-up time is increased from about 15 minutes at 65° F. to about 40 minutes at 55° F. Faster set-up rates are achievable with higher sand temperatures and more favorable (e.g. lower) alumina/silica mole ratios.

The rate of green strength development for the various alumina to silica mole ratio mixes at various temperatures shown in FIGS. 2 through 4 are found to be exponential relationships which plot as straight lines on semilogarithmic graphs. The least squares fit lines shown in the figures are generated by using standard regression analysis techniques.

Inclusion of alumina bearing material, such as kaolin clay, into the novel aluminosilicate system is desirable to optimize mix properties and produce molds eminently suitable as molten metal receivers. As shown in Table II, in all cases tensile strengths are maintained and hot compressive strengths are improved in mixes with a clay material addition, over those without the addition at the same binder content.

TABLE II

| BINDER COMPOSITION | | | | CURED SAND PROPERTIES | | |
|---|---|---|---|---|---|---|
| Liquid | | | | Tensile | Hot | |
| Al$_2$O$_3$:SiO$_2$ | | Dry Additives | | Strength | Strength | LOI |
| Mole Ratio | Wt. % | Type | Wt. % | (psi) | (psi) | (%) |
| 0.5 | 4.0 | — | — | 80 | 2 | 0.8 |
| 0.5 | 4.75 | — | — | 130 | 2 | 1.1 |
| 0.5 | 5.50 | — | — | 160 | 5 | 1.8 |
| 0.5 | 4.0 | Calcined Kaolin | 2.0 | 70 | 30 | 1.1 |
| 0.5 | 4.75 | Calcined Kaolin | 2.0 | 120 | 30 | 1.1 |
| 0.5 | 5.50 | Calcined Kaolin | 2.0 | 150 | 40 | 1.8 |
| 0.5 | 6.00 | Calcined Kaolin | 2.0 | 200 | 40 | 2.1 |
| 1.0 | 4.0 | — | — | 70 | 2 | 0.9 |
| 1.0 | 4.75 | — | — | 110 | 3 | 1.3 |
| 1.0 | 5.5 | — | — | 150 | 2 | 2.0 |
| 1.0 | 4.0 | Calcined Kaolin | 2.0 | 65 | 25 | 1.0 |
| 1.0 | 4.75 | Calcined Kaolin | 2.0 | 113 | 36 | 1.2 |
| 1.0 | 5.50 | Calcined Kaolin | 2.0 | 150 | 40 | 1.9 |
| 1.0 | 5.50 | Calcined Kaolin | 3.0 | 140 | 50 | 2.0 |
| 1.0 | 5.50 | Calcined Kaolin | 4.0 | 130 | 70 | 2.0 |

The addition of inorganic fillers such as mullite and calcined or uncalcined clays appears to have small effect on the rate of compressive strength development. Their inclusion does however affect the overall sand properties achievable, as will be shown later. High relative humidity (greater than 75%) is found to have little effect on the initial rate of compressive strength development, but does significantly lower the ultimate strengths achieved.

The effect of refractory grain fineness, refractory density and grain shape on sand mixes is summarized in Table III. These data represent values for sand mixes employing a binder having an alumina/silica mole ratio of 1.0 under ambient conditions of 65°-70° F. and 50-60% humidity.

TABLE III

| Refractory Type | AFSGFN | Binder Composition Al₂O₃:SiO₂ Mole Ratio | Wt. % | Kaolin Content Wt. % | Tensile Strength (psi) | Hot Strength (psi) |
|---|---|---|---|---|---|---|
| Silica | 68 | 1.0 | 4.14 | 2.0 | 140 | 54 |
| Silica | 95 | 1.0 | 4.14 | 2.0 | 90 | 60 |
| Zircon | 105 | 1.0 | 2.07 | 1.0 | 160 | 150 |
| Mulgrain | 105 | 1.0 | 8.28 | 2.0 | 115 | 80 |

In Table IV, the effect of kaolin additions on properties of the mix at alumina/silica mole ratios near the preferred limits is reported for both standard air set properties and the resultant change in these properties upon exposure to 90% relative humidity for an additional 24 hours. The standard air set properties given in this table are for samples cured at 50% relative humidity and 72°-75° F. for at least 24 hours. As appears from the data presented, some loss in tensile strength results with addition of kaolin clay but reference to Table II shows that hot strength is substantially increased by such inclusion.

TABLE IV

| Alumina to Silica Binder Mole Ratio | Total Binder (%) | Calcined Kaolin-Content (%) | Air Set Properties Tensile Strength (psi) | LOI (%) | Properties After Exposure to 90% Relative Humidity Tensile Strength (psi) | LOI (%) |
|---|---|---|---|---|---|---|
| 0.5 | 4.75 | 0 | 130 | 1.14 | 86 | 1.77 |
| 0.5 | 4.75 | 2.0 | 100 | 1.16 | 70 | 1.79 |
| 1.0 | 4.75 | 0 | 118 | 1.34 | 90 | 1.74 |
| 1.0 | 4.75 | 2.0 | 105 | 1.22 | 86 | 1.84 |

Binders prepared by reacting sodium aluminate with silicates other than the preferred standard Grade 50 sodium silicate ($2SiO_2:Na_2O$) show that these are also effective in producing a bond of the refractory particles. For example, a commonly available sodium silicate solution having a silica to soda ratio of 3.22:1, also potassium silicate (silica to potash ratio of 3.92:1) and colloidal silica such as "Nalco 1130" all produce satisfactory gels. However the optimum $Al_2O_3:SiO_2$ mole ratio in the resulting gel may in these cases vary from the 1.0 to 0.5 mentioned above.

As in other binder systems containing water (such as waterglass, investment colloidal silica, hydraulic cement bonded systems), the relative humidity of the curing atmosphere affects the strength development in the novel aluminosilicate bonded sand molds.

FIG. 5 depicts the effects on compressive strength of a 24 hour cure upon increasing the relative humidity from 50% to 90% in the atmosphere, at constant (70° F.) temperature. The two curves represent alumina/silica mole ratios of 1.0 and 0.5. In both systems, the molds cured at 90% relative humidity achieve no more than one-half the compressive strength of those cured at 50% relative humidity. Notation is also made on the curves as to water contents of samples at the humidity levels, showing that water levels for samples cured at 90% relative humidity are at least double those of samples cured at 50% relative humidity.

Additional evidence of the effect of relative humidity is provided in Table IV, which collates data relevant to final strength development and moisture re-absorption for the 0.5 and 1.0 alumina/silica mole ratio systems. As appears from the data presented, exposure to 90% relative humidity will decrease tensile strength and increase (LOI) the moisture content of bonded sand mass. This degradation in properties, however, is considered slight in comparison to the conventional silicate-ester binder systems; and green sand systems, for example, typically contain between 3 and 4 percent water just prior to metal casting even under the most favorable humidity conditions.

An advantage of the invention system is that, once properly cured such as at ambients of 70° F. and 50% humidity, for periods of 24 to 48 hours, the aluminosilicate binder is more resistant to degradation by moisture than most other commercially available binder systems, including the commonly used silicate systems.

Using sand mixes as described above, molds employing the novel aluminosilicate binder system have been successfully produced using three different types of molding operations: slip flask, jolt-squeeze molding; deposition of facing sand of mixes of this invention with a green sand back-up from a slinger system; and jolt-squeeze molding of facing sand of the invention followed by green sand back-up using a tight flask arrangement. Molds ranging in size from 11"×13" up to 48"×48" have been made with the above types of molding operations, and the castings produced have been equal to or better than castings produced from totally green sand molds made in a like manner.

A number of patterns, representing a range of casting complexities, were selected to compare the aluminosilicate binder system with standard green sand molding practice. The patterns selected for these comparisons include an 8" plug type valve body and 10" centrifugal pump casing castings of several different configurations. Molds were made using both green sand and aluminosilicate bonded facing sands and a jolt-squeeze, tight flask molding operation. All molds were poured as quickly after molding as possible (generally between 1 and 4 hours, although pour-off can be delayed for a much longer time) from commercial alloy heats produced by The Duriron Company, Inc. of Dayton, Ohio).

The molds were poured in pairs (i.e., one aluminosilicate bonded mold and one green sand mold of the same pattern), and castings were carefully followed through subsequent inspection and cleaning operations. The grinding and weld repair studies show an overall reduction of 30.4% in hand grinding times and 35.1% in weld repair times for the castings produced from the aluminosilicate bonded molds.

All castings were radiographed for internal quality and then processed through a dimensional audit to determine the dimensional accuracy of each casting. The radiographic and dimensional evaluations showed no potential problems related to the invention molding system in these areas, and all castings were found to be acceptable radiographically and dimensionally.

A further comparison between pattern, mold and casting dimensions was also conducted to determine if the hard mold system might inhibit the free contraction of the casting during cooling. The comparison showed no dimensional problem with the invention molds.

In addition to molds, the sand mixes of this invention have also been tested successfully under production conditions to make cores for a variety of castings. Cores bonded with the aluminosilicate system were evaluated in 10", 13", and 14" jacketed centrifugal pump casing rear covers; also 6" and 10" centrifugal pump casing using green sand molds. The castings produced with these cores exhibited good core surface finish, were acceptable by radiography, and were acceptable dimensionally.

Aluminosilicate bonded cores have been made in sizes ranging from less than 1 pound to more than 100 pounds without difficulties. Dimensional conformance of these cores is excellent.

A series of test cores prepared from the aluminosilicate bonded sand mixes were exposed to various environments and then dimensioned to determine the effects of the curing treatments on the dimensional reproducibility of the cores. These curing treatments consisted of exposure to both high and low humidity, as well as baking. The results of these examinations demonstrate that variations in curing conditions have little or no effect on the dimensional reproducibility of the proposed aluminosilicate binder systems for core production.

In addition to the bonding and forming of foundry molds and cores, this invention binder system herein described has also been utilized to bond other forms of particulate or granular material for such potential applications as grinding wheels, electrical or thermal insulators, bricks, briquetting of loose materials and the like. Examples of such granular and loose materials successfully bonded with the aluminosilicate system include:

1. Vermiculite
2. Mica
3. Perlite
4. Crushed sandstone and firebrick
5. Bubble alumina and silica granules
6. Calcined and uncalcined clays
7. Wood flour
8. Saw dust
9. Ground cereals and their by-products
10. Styrofoam granules The following example demonstrates the feasibility of using the aluminosilicate bonding system with perlite granules to form insulating refractory shapes. Perlite is a light weight, expanded volcanic rock material commonly used as an insulating additive in concrete and plaster systems.

EXAMPLE 3

25 pbw Perlite
100 pbw Ground perlite
72 pbw Sodium silicate (2.0 $SiO_2:Na_2O$)
60 pbw Sodium aluminate (1.0 $Al_2O_2:Na_2O$)
68 pbw Water The water addition in the above composition is distributed between the sodium silicate and sodium aluminate solutions with 28 pbw added to the silicate and 40 pbw added to the aluminate. After blending the two forms of perlite, the remaining solutions are just blended by themselves and then added to the dry mixture. Intense mixing for up to 15–20 seconds follows or until a uniform dispersion of liquids is accomplished. This final mixing should not go on beyond 30–40 seconds for best results. The resulting mixture may then be cast or poured into the molding media to form the desired shape. Within 3 minutes at 70°–75° F., the mixture will have set and may be removed from the mold. After a 24 to 48 hour cure period, the shape may be further treated by baking at temperatures up to 1000° F. Baking in this manner removes residue water and provides an operating refractoriness of the shape at temperatures up to 2200° F. To improve the refractoriness of such shapes, bubble alumina granules may be substituted for the perlite materials in the above example.

What is claimed is:

1. Formed shapes of refractory material which are composed of a moldable mix that is self-setting without baking at ambient atmospheric conditions, said mix comprising at least 90% by weight of refractory granular particles, and an aluminosilicate hydrogel binder having a mole ratio of alumina to silica of about 0.33 to 2.0 for retaining said particles in said formed shapes, said binder consisting of an alkaline mixture of aqueous solutions containing, respectively, a water soluble source of silica and a water soluble source of alumina, said solutions being combined in said granular mix in proportion to produce said aluminosilicate hydrogel binder under said ambient atmospheric conditions, said aluminosilicate hydrogel producing in said formed shapes a minimum compressive strength of about 12 psi within 60–65 minutes at 50° F. or within 10–12 minutes at 80° F. ambient temperature, 50% humidity, and forming a substantially water-resistant rigid bond between the particles of the mix after molding said mix into said shapes.

2. Formed shapes as defined in claim 1, wherein said solutions of water soluble sources of silica and alumina are proportioned to produce said substantially water-resistant rigid bond in not more than 30 minutes.

3. Formed shapes as defined in claim 1, wherein said particles are refractory granules of siliceous or metal oxide type selected from the group consisting of quartz, zircon, kaolin, mullite, olivine, chromite, aluminosilicate and mixtures thereof.

4. Formed shapes as defined in claim 3 which are totally inorganic in composition.

5. A totally inorganic formed shape according to claim 1, comprising a foundry sand mold for casting metal, said mold being composed of a moldable sand mix that is self-setting at ambient atmospheric conditions, said mix containing a preponderance of siliceous refractory granules and a minor amount of a fluid binder, said binder consisting of an alkaline admixture of aqueous solutions of soluble silicates and aluminates in such proportion that the mole ratio of alumina to silica in the gel formed by the reaction between the solutions is between about 0.33 and 2.0.

6. A foundry mold as defined in claim 5, wherein said siliceous refractory granules comprise at least about 90% by weight of the mix.

7. A foundry mold as defined in claim 6, wherein said siliceous refractory granules are selected from the group consisting of quartz, zircon, kaolin, mullite, olivine, alumino-silicate and mixtures thereof.

8. A foundry mold as defined in claim 7, wherein said refractory granules consist of a mixture of (a) quartz, zircon or mixtures thereof having an AFSGN of 68–70 and totalling 100 parts by weight, (b) kaolin at least 1 part by weight and (c) mullite from 0 to 3 parts by weight.

9. A foundry mold as defined in claim 8, wherein said alkali metal solutions together comprise from about 4 to 6 parts by weight of said sand mix.

10. A foundry mold as defined in claim 9, wherein the mole ratio of alumina to silica in the binder gel is from about 0.45 to 1.0.

11. A foundry mold as defined in claim 9, wherein said refractory granules consist of 100 parts by weight of quartz, 2 parts by weight of kaolin, and said binder comprises 2.4 parts by weight sodium silicate ($SiO_2$:$Na_2O$=2:1, 44.1% solids, 55.9% water, sp. gr. 1.53) and 2.3 parts by weight sodium aluminate ($Al_2O_3$:$Na_2O$=1:1, 45% solids, 55% water, sp.gr. 1.56).

12. A foundry mold as defined in claim 11, wherein said refractory granules also include mullite up to about 3 parts by weight.

13. A foundry mold as defined in claim 9, wherein said aluminate and silicate are the sodium salts thereof and said solutions contain about 40 to 45% by weight solids, the balance being water.

14. A foundry mold for metal castings, said mold resulting from a mix comprising a composition which, when filled into a foundry mold flask and compacted against a pattern therein, acquires under ambient atmospheric conditions a sufficient set to be self-supporting upon removal of the mold or core from the pattern in a controllable time interval of from 60 to 90 seconds, said mix as initially prepared having a composition comprising a refractory granule base consisting essentially of zircon or silica sand or mixtures thereof in predominating proportion and minor amount of kaolin, and a binder solution constituting not more than about 6% by weight of the total mix, said binder solution forming an aluminosilicate gel resulting from reaction between aqueous solutions of an alkali metal silicate and an alkali metal aluminate, wherein the mole ratio of alumina to silica in the gel is from 0.33 to 2.0 and the total solids in said solutions is about 45% by weight.

15. A foundry mold according to claim 14, said mold having a compressive strength of not less than 150 psi after curing at ambient atmospheric conditions for not more than 4 hours, and a retained compressive strength of not over 100 psi after molten metal has been cast in it.

16. A foundry mold according to claim 14, resulting from a foundry sand mix having the following composition as initially prepared:
  a refractory granule base consisting essentially of zircon or silica sand or mixtures thereof in amount of at least about 94% by weight; kaolin in amount of from about 1% to 3% by weight; and mullite up to about 3% by weight; and
  said binder constituting not more than about 6% by weight of the total mix, said binder comprising an aluminosilicate gel resulting from reaction between a sodium silicate solution having a specific gravity of about 1.53 and a silica-to-soda ratio of 2:1 with a sodium aluminate solution having a specific gravity of about 1.56 and an aluminum oxide-to-soda ratio of 1:1, wherein the mole ratio of alumina to silica in the resulting gel is approximately 0.5.

17. A method of preparing a no-bake, self-setting granular mix containing a major proportion by weight of granular particles and a minor proportion by weight of a liquid binder, said method comprising
  blending a first portion of said granular particles with an aqueous solution of a water soluble source of silica, and blending a second portion of said granular particles with an aqueous solution of a water soluble source of alumina, and combining said blended granular portions to effect intimate mixing thereof;
  said solutions being combined with the respective portions of granular particles in proportion to produce in the combined blended portions an aluminosilicate hydrogel having a mole ratio of alumina to silica between about 0.33 and 2.0.

18. A method as defined in claim 17, wherein said granular particles comprise at least about 90% by weight of the mix.

19. A method of preparing a foundry sand mix as defined in claim 17, which includes proportioning the amount of said alkali metal solutions to produce an aluminosilicate hydrogel having a mole ratio of alumina to silica of from 1.0 to 0.5.

20. A method of preparing a foundry sand mix as defined in claim 17, wherein from about 1 to 3 parts by weight of kaolin are incorporated into said granule base during blending.

21. A method of preparing a foundry sand mix as defined in claim 20, wherein up to 3 parts by weight of mullite are incorporated in said granule base during blending.

22. A method of preparing a foundry sand mix as defined in claim 17, wherein said alkali metal solutions together comprise from about 4 to 6 parts by weight of said sand mix.

23. A method of preparing a totally inorganic foundry sand mix for making molds for metal castings, wherein said mix, when filled at ambient atmospheric conditions into a foundry flask or core box and compacted therein, acquires sufficient set within a controllable time as short as 60 to 90 seconds to be self-supporting upon removal of the mold from the flask or core box, said method comprising:
  blending a refractory granule base comprising silica or zircon sand, or mixtures thereof, in predominating proportion and a minor amount of kaolin, said granule base comprising not less than about 90% by weight of the final sand mix;
  dividing said granule base into separate portions and introducing said portions into respectively separate mixing devices and simultaneously incorporating with one such portion an aqueous alkali metal aluminate solution and with such other portion an aqueous alkali metal silicate solution, said aqueous solutions being proportioned to produce on reaction between them an aluminosilicate hydrogel having an alumina to silica mole ratio of between 0.33 and 2.0,
  agitating said respective portions of said granule base and alkali metal solution to uniformly distribute the respective solutions throughout their respective granule base portions;
  combining said granule base portions in another mixing device to promote thorough mixing of said portions and the formation of said aluminosilicate hydrogel on the granules, whereby it serves as a binder for said foundry sand mix which is self-settable under ordinary ambient atmospheric conditions to provide rigid molds for casting molten metal.

24. A method of preparing a foundry sand mix as defined in claim 23, which includes proportioning the amount of said alkali metal solutions to produce said aluminosilicate hydrogel having a mole ratio of alumina to silica of from 1.0 to 0.5.

25. A method of preparing a foundry sand mix as defined in claim 24, wherein from about 1 to 3 parts by weight of kaolin are incorporated in said granule base during blending.

26. A method of preparing a foundry sand mix as defined in claim 24, wherein up to 3 parts by weight of mullite are incorporated in said granule base during blending.

27. A method of preparing a foundry sand mix as defined in claim 24, which comprises adding to said portions of said granule base sufficient of said alkali metal aluminate and silicate solutions such that together they constitute from about 4 to 6 parts by weight of said sand mix.

* * * * *